US012795479B2

(12) United States Patent
Akl et al.

(10) Patent No.: US 12,795,479 B2
(45) Date of Patent: Nov. 10, 2026

(54) MEASUREMENT AND REPORTING FOR SERVING AND CANDIDATE CELLS

(71) Applicant: QUALCOMM Incorporated, San Diego, CA (US)

(72) Inventors: Naeem Akl, Bridgewater, NJ (US); Jelena Damnjanovic, Del Mar, CA (US); Tao Luo, San Diego, CA (US); Ozcan Ozturk, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 314 days.

(21) Appl. No.: 18/418,138

(22) Filed: Jan. 19, 2024

(65) Prior Publication Data

US 2024/0284281 A1 Aug. 22, 2024

Related U.S. Application Data

(60) Provisional application No. 63/485,171, filed on Feb. 15, 2023.

(51) Int. Cl.
*H04W 36/04* (2009.01)
*H04W 36/00* (2009.01)

(52) U.S. Cl.
CPC ....... *H04W 36/04* (2013.01); *H04W 36/0058* (2018.08); *H04W 36/0061* (2013.01)

(58) Field of Classification Search
CPC ............. H04W 36/04; H04W 36/0058; H04W 36/0061; H04W 36/0094
See application file for complete search history.

(56) References Cited

U.S. PATENT DOCUMENTS

2024/0147328 A1* 5/2024 Kim ...................... H04W 36/30
2024/0267820 A1* 8/2024 Zhou ................. H04W 36/0085
2024/0406811 A1* 12/2024 Zhang .................. H04W 36/04
2025/0175864 A1* 5/2025 Kim .................. H04W 36/0077
(Continued)

FOREIGN PATENT DOCUMENTS

WO WO-2024145854 A1 * 7/2024 ............ H04W 36/00

OTHER PUBLICATIONS

Akl N (Qualcomm Incorporated)., et al., "Characteristics and Scenarios of LTM", 3GPP Draft, 3GPP TSG-RAN WG2 Meeting #120, R2-2212245, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov 18, 2022, Nov. 3, 2022, XP052216329, 5 pages, sections 1-2.1.1, pp. 1-3.
(Continued)

*Primary Examiner* — Ayaz R Sheikh
*Assistant Examiner* — Mang Boi Thawng
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a configuration of a cell that is a serving cell and a candidate layer 1 or layer 2 triggered mobility (LTM) cell. The UE may receive, from the network node, a measurement or reporting configuration for the cell that is the serving cell and the candidate LTM cell. The UE may transmit, to the network node, a measurement report based at least in part on the measurement or reporting configuration. Numerous other aspects are described.

20 Claims, 12 Drawing Sheets

(56) References Cited

U.S. PATENT DOCUMENTS

| | | | | |
|---|---|---|---|---|
| 2025/0261064 | A1* | 8/2025 | Kim | H04W 36/08 |
| 2025/0280341 | A1* | 9/2025 | Gu | H04W 36/0061 |
| 2025/0338161 | A1* | 10/2025 | Zhou | H04L 5/0048 |

OTHER PUBLICATIONS

International Search Report and Written Opinion—PCT/US2024/012382—ISA/EPO—Jun. 5, 2024.

Palle N (Apple Inc)., et al., "Dissecting the UE Processing for RRC LTM Config", 3GPP Draft, 3GPP TSG RAN WG2#120, R2-2211711, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, XP052215815, 6 pages, the whole document.

Shi Y (Huawei)., et al., "Solutions to Cell Switch in LTM", 3GPP Draft, 3GPP TSG-RAN WG2 Meeting #120, R2-2211642, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, XP052215746, 5 pages, sections 1-2.1, pp. 1-2.

Zhang M (ZTE Corporation)., et al., "Discussion on Candidate Cell Configuration and Maintenance", 3GPP Draft, 3GPP TSG-RAN WG2 Meeting #120, R2-2211794, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, XP052215898, 9 pages, sections 2.1-2.3, pp. 2-8.

Zhou R (CATT)., et al., "Discussion on RRC Aspects for LTM", 3GPP Draft, 3GPP TSG-RAN WG2 Meeting #120, R2-2211203, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, XP052215315, pp. 1-5, the whole document.

* cited by examiner

MEASUREMENT AND REPORTING FOR SERVING AND CANDIDATE CELLS

CROSS-REFERENCE TO RELATED APPLICATION

This Patent Application claims priority to U.S. Provisional Patent Application No. 63/485,171, filed on Feb. 15, 2023, entitled "MEASUREMENT AND REPORTING FOR SERVING AND CANDIDATE CELLS," and assigned to the assignee hereof. The disclosure of the prior application is considered part of and is incorporated by reference into this Patent Application.

FIELD OF THE DISCLOSURE

Aspects of the present disclosure generally relate to wireless communication and to techniques and apparatuses for measurement and reporting for serving and candidate cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories and one or more processors, coupled to the one or more memories, configured to: receive, from a network node, a configuration of a cell that is a serving cell and a candidate layer 1 or layer 2 triggered mobility (LTM) cell; receive, from the network node, a measurement or reporting configuration for the cell that is the serving cell and the candidate LTM cell; and transmit, to the network node, a measurement report based at least in part on the measurement or reporting configuration.

In some implementations, an apparatus for wireless communication at a network node includes one or more memories and one or more processors, coupled to the one or more memories, configured to: transmit, to a UE, a configuration of a cell that is a serving cell and a candidate LTM cell; transmit, to the UE, a measurement or reporting configuration for the cell that is the serving cell and the candidate LTM cell; and receive, from the UE, a measurement report based at least in part on the measurement or reporting configuration.

In some implementations, a method of wireless communication performed by a UE includes receiving, from a network node, a configuration of a cell that is a serving cell and a candidate LTM cell; receiving, from the network node, a measurement or reporting configuration for the cell that is the serving cell and the candidate LTM cell; and transmitting, to the network node, a measurement report based at least in part on the measurement or reporting configuration.

In some implementations, a method of wireless communication performed by a network node includes transmitting, to a UE, a configuration of a cell that is a serving cell and a candidate LTM cell; transmitting, to the UE, a measurement or reporting configuration for the cell that is the serving cell and the candidate LTM cell; and receiving, from the UE, a measurement report based at least in part on the measurement or reporting configuration.

In some implementations, a non-transitory computer-readable medium storing a set of instructions for wireless communication includes one or more instructions that, when executed by one or more processors of a UE, cause the UE to: receive, from a network node, a configuration of a cell that is a serving cell and a candidate LTM cell; receive, from the network node, a measurement or reporting configuration for the cell that is the serving cell and the candidate LTM cell; and transmit, to the network node, a measurement report based at least in part on the measurement or reporting configuration.

In some implementations, a non-transitory computer-readable medium storing a set of instructions for wireless communication includes one or more instructions that, when executed by one or more processors of a network node, cause the network node to: transmit, to a UE, a configuration of a cell that is a serving cell and a candidate LTM cell; transmit, to the UE, a measurement or reporting configuration for the cell that is the serving cell and the candidate LTM cell; and receive, from the UE, a measurement report based at least in part on the measurement or reporting configuration.

In some implementations, an apparatus for wireless communication includes means for receiving, from a network node, a configuration of a cell that is a serving cell and a candidate LTM cell; means for receiving, from the network node, a measurement or reporting configuration for the cell that is the serving cell and the candidate LTM cell; and means for transmitting, to the network node, a measurement report based at least in part on the measurement or reporting configuration.

In some implementations, an apparatus for wireless communication includes means for transmitting, to a UE, a configuration of a cell that is a serving cell and a candidate LTM cell; means for transmitting, to the UE, a measurement or reporting configuration for the cell that is the serving cell and the candidate LTM cell; and means for receiving, from the UE, a measurement report based at least in part on the measurement or reporting configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
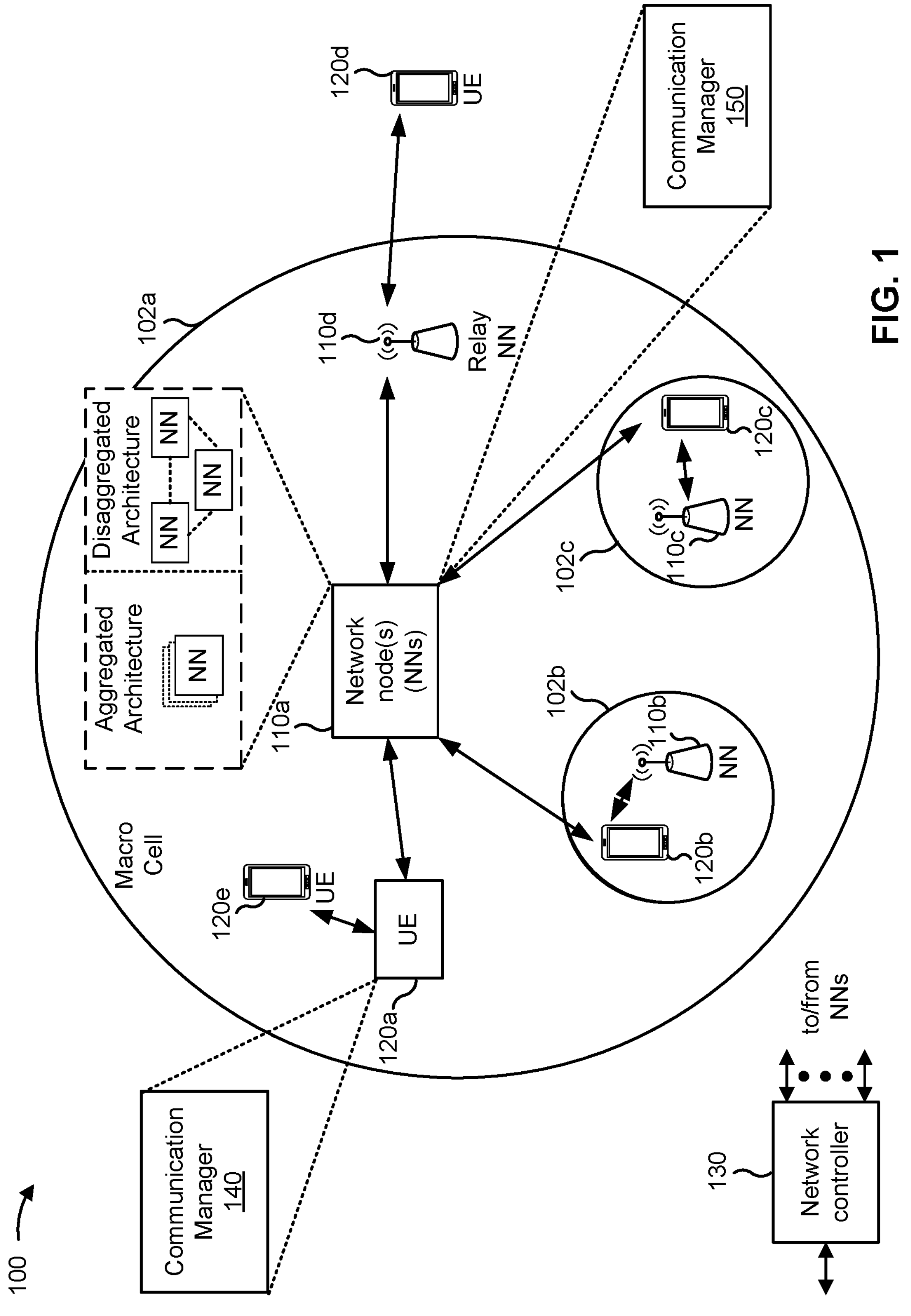
FIG. 1 is a diagram illustrating an example of a wireless network, in accordance with the present disclosure.

A cell may be both a serving cell and a candidate layer 1 (L1) or layer 2 (L2) (L1/L2)-triggered mobility (LTM) cell. For example, the cell may be a serving secondary cell (SCell) and a candidate LTM primary cell (PCell). Alternatively, the cell may be a serving PCell and a candidate LTM SCell. However, a user equipment (UE) that is associated with the cell may not be configured for measurements and reporting of the cell. In other words, when the cell is both the serving cell and the candidate LTM cell at the same time instance, measurements and reporting may not be configured to the UE for the cell. As a result, the UE may be unable to perform measurements for the cell and report the measurements for the cell, which may degrade a performance of the UE when an LTM cell switch is needed (e.g., due to poor network conditions) but may not be triggered due to the lack of measurements and reporting.

In some aspects, the UE may receive, from a network node, a configuration of a cell that is a serving cell and a candidate LTM cell. The cell may be a serving PCell and the candidate LTM cell may be a candidate LTM SCell. Alternatively, the cell may be a serving SCell and the candidate LTM cell may be a candidate LTM PCell. The serving SCell may be activated or deactivated. The UE may receive, from the network node, a measurement or reporting configuration for the cell that is the serving cell and the candidate LTM cell. In some cases, the UE may receive a measurement and reporting configuration for the cell that is the serving cell and the candidate LTM cell. The UE may transmit, to the network node, a measurement report based at least in part on the measurement or reporting configuration. As a result, the UE may be able to perform measurements for the cell and report the measurements for the cell when the cell is both the serving cell and the candidate LTM cell, which may improve a performance of the UE. The measurements and reporting of the cell may enable the network node to perform a cell switch for the UE, which may improve a performance of the UE. In other words, when the UE needs to switch to another cell to have favorable coverage, the network node may be able to initiate the cell switch because the network node receives the measurements from the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node

110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, a configuration of a cell that is a serving cell and a candidate LTM cell; receive, from the network node, a measurement or reporting configuration for the cell that is the serving cell and the candidate LTM cell; and transmit, to the network node, a measurement report based at least in part on the measurement or reporting configuration. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, a configuration of a cell that is a serving cell and a candidate LTM cell; transmit, to the UE, a measurement or reporting configuration for the cell that is the serving cell and the candidate LTM cell; and receive, from the UE, a measurement report based at least in part on the measurement or reporting configuration. Additionally, or alternatively, the communication manager 150 may perform one or more other operations described herein.

As indicated above, FIG. 1 is provided as an example. Other examples may differ from what is described with regard to FIG. 1.

Figure 2:
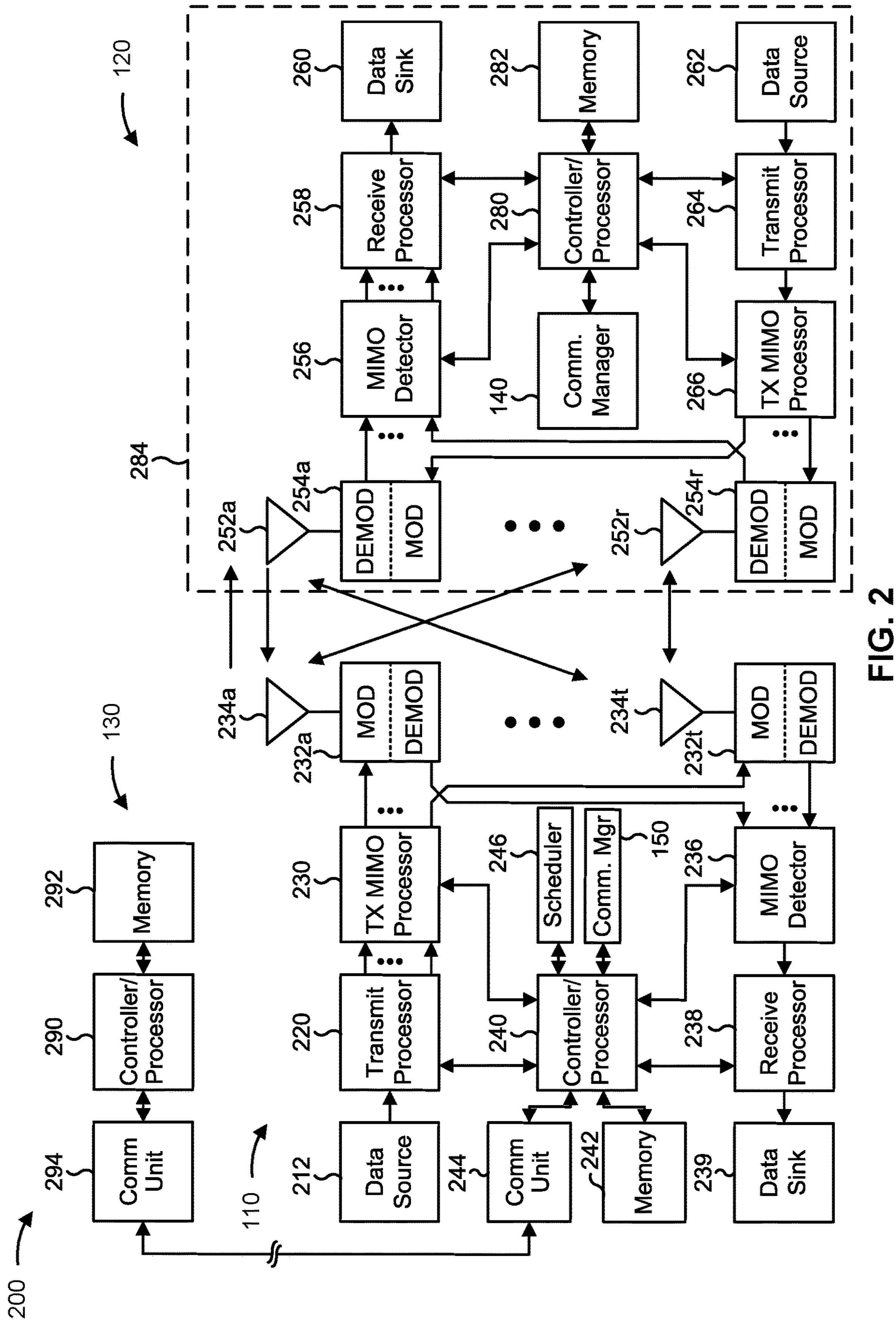
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the network node 110, the controller/processor 280 of the UE 120, and/or any other component(s) of FIG. 2 may perform one or more techniques associated with measurement and reporting for serving and candidate cells, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, a configuration of a cell that is a serving cell and a candidate LTM cell; means for receiving, from the network node, a measurement or reporting configuration for the cell that is the serving cell and the candidate LTM cell; and/or means for transmitting, to the network node, a measurement report based at least in part on the measurement or reporting configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE, a configuration of a cell that is a serving cell and a candidate LTM cell; means for transmitting, to the UE, a measurement or reporting configuration for the cell that is the serving cell and the candidate LTM cell; and/or means for receiving, from the UE, a measurement report based at least in part on the measurement or reporting configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
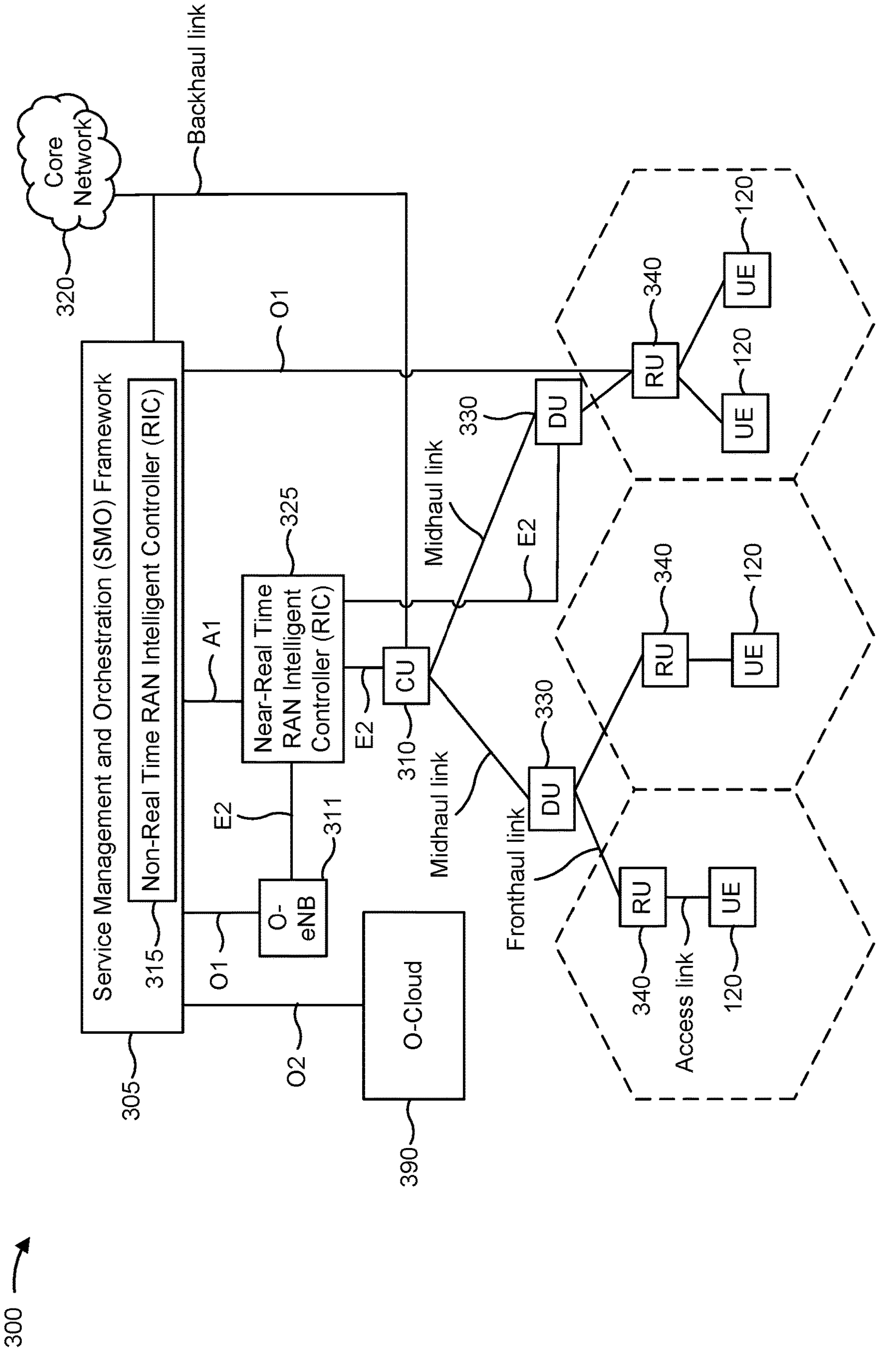
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
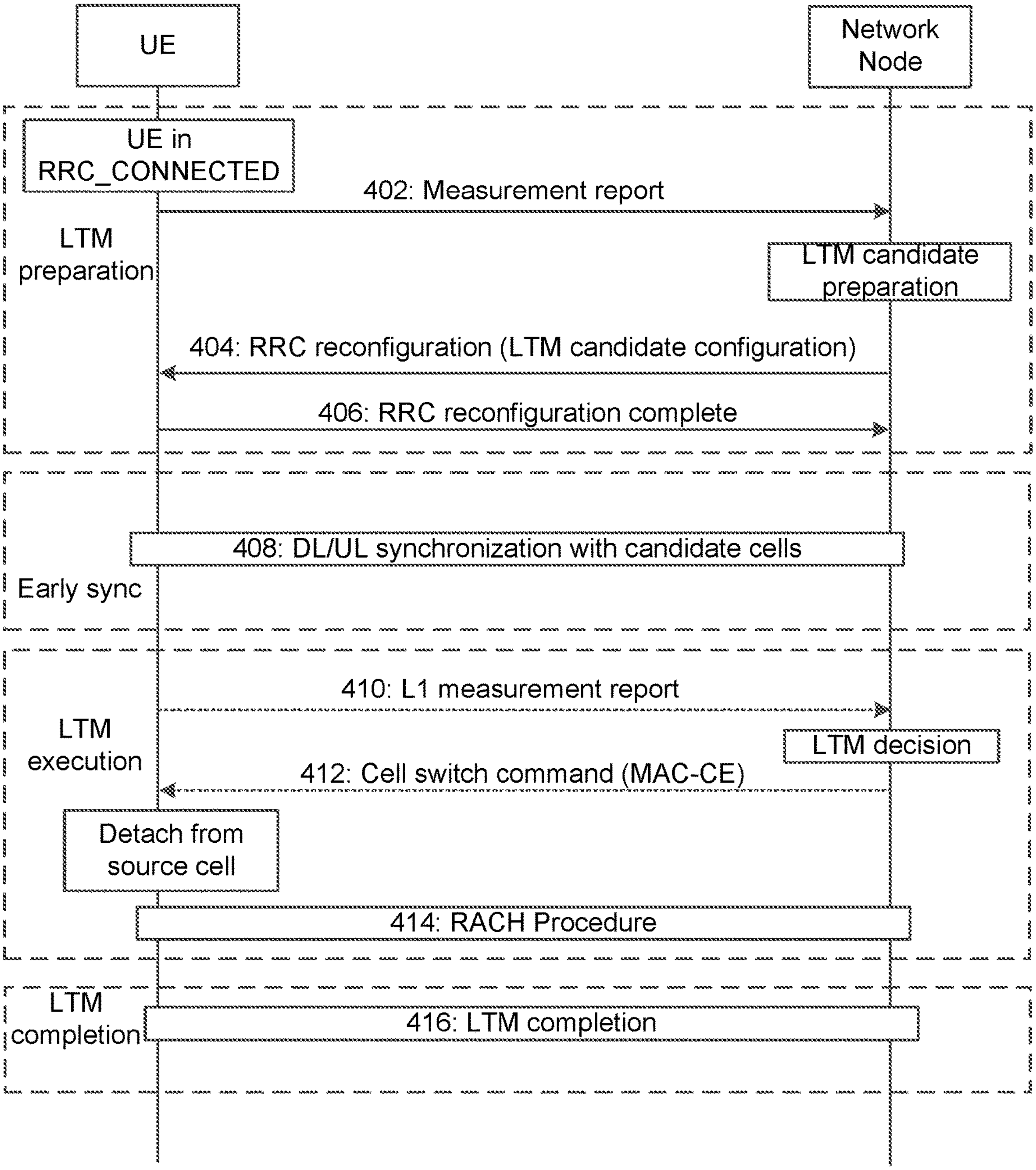
FIG. 4 is a diagram illustrating an example of a layer 1 (L1) or a layer 2 (L2) (L1/L2)-triggered mobility (LTM), in accordance with the present disclosure.

FIG. 4 is a diagram illustrating an example 400 of an LTM, in accordance with the present disclosure.

In an LTM, a UE may be in an RRC connected state. As shown by reference number 402, the UE may transmit, to a network node, a measurement report. The UE may transmit the measurement report via RRC signaling. The network node may determine, based at least in part on the measurement report, to use LTM and may initiate a candidate LTM cell preparation. As shown by reference number 404, the network node may transmit, to the UE, an RRC reconfiguration message. The RRC reconfiguration message may indicate a candidate LTM cell configuration, which may indicate a configuration of one or multiple candidate LTM target cells. The UE may store the candidate LTM cell configuration. As shown by reference number 406, the UE may transmit, to the network node, an RRC reconfiguration complete message. The measurement report, the RRC reconfiguration message, and the RRC reconfiguration complete message may be part of an LTM preparation phase.

As shown by reference 408, the UE may perform a downlink/uplink synchronization and a timing advance (TA) acquisition with candidate target cells, which may occur before receiving an LTM cell switch command. The downlink/uplink synchronization and the TA acquisition may be associated with an early synchronization phase. The UE may perform L1 measurements on one or more configured candidate LTM target cells. As shown by reference number 410, the UE may transmit, to the network node, an L1 measurement report, which may indicate the L1 measurements on the one or more configured candidate LTM target cells. The network node may determine to execute an LTM cell switch to a target cell, which may be based at least in part on the L1 measurement report. As shown by reference number 412, the network node may transmit, to the UE, a MAC control element (MAC-CE) triggering the LTM cell switch, where the MAC-CE may indicate a candidate configuration index of the target cell. The UE may detach from a source cell. The UE may apply the candidate configuration index of the target cell. In other words, the UE may switch to a configuration of a candidate LTM target cell. The UE may detach from the source cell and attach to the target cell as part of an LTM execution phase.

As shown by reference number 414, the UE may perform a random access channel (RACH) procedure with the target cell (e.g., when a TA is not available). As shown by reference number 416, the UE may transmit, to the target cell, an indication of a successful completion of the LTM cell switch to the target cell. The indication of the successful completion of the LTM cell switch may be part of an LTM completion phase.

As indicated above, FIG. 4 is provided as an example. Other examples may differ from what is described with regard to FIG. 4.

Figure 5:
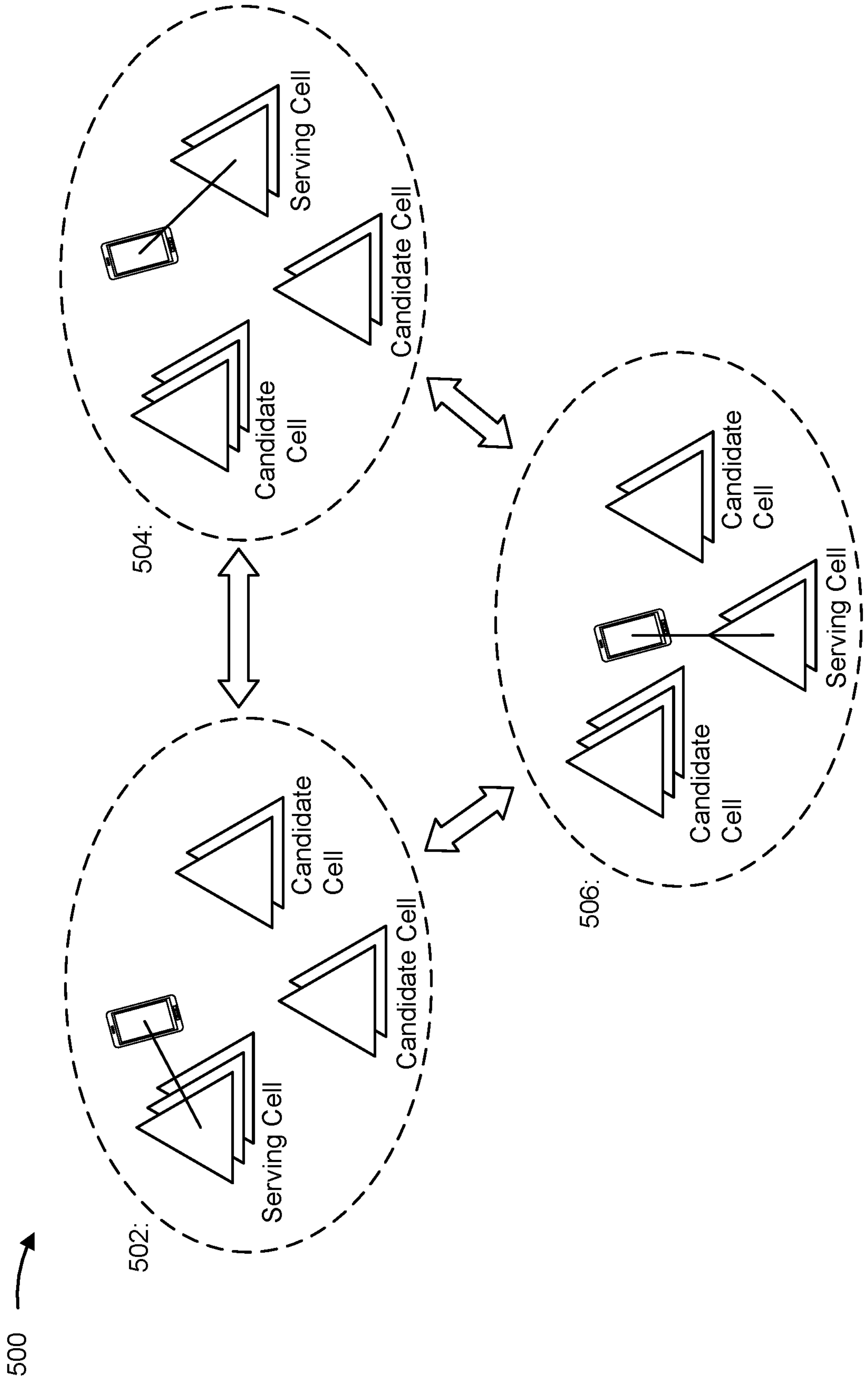
FIG. 5 is a diagram illustrating an example of a cell switch between L1/L2 mobility candidate cells, in accordance with the present disclosure.

FIG. 5 is a diagram illustrating an example 500 of a cell switch between L1/L2 mobility candidate cells, in accordance with the present disclosure.

As shown by reference number 502, at a first point in time, a UE may be associated with a serving cell. The serving cell may or may not be associated with a serving cell group. The UE may perform measurements for one or more candidate cells. A candidate cell may or may not be associated with a candidate cell group. As shown by reference number 504, at a second point in time, the UE may switch to one of the candidate cells, which may become the serving cell, and other cells may become or remain candidate cells. As shown by reference number 506, at a third point in time, the UE may switch to one of the candidate cells, which may become the serving cell, and other cells may become or remain candidate cells.

In a subsequent LTM, the UE may perform a cell switch between L1/L2 mobility candidate cells (e.g., candidate LTM target cells). The cell switch between the L1/L2 mobility candidate cells may not involve an RRC reconfiguration. In other words, a sequential L1/L2 cell change between candidates without RRC reconfiguration may be supported. The cell switch without the RRC reconfiguration may still involve a downlink/uplink synchronization with candidate target cells, L1 measurement reporting, a cell switch command (e.g., a MAC-CE), and/or a RACH procedure.

As indicated above, FIG. 5 is provided as an example. Other examples may differ from what is described with regard to FIG. 5.

An L1/L2 mobility may include a non-carrier-aggregation scenario (e.g., a PCell only) and/or a carrier aggregation scenario (e.g., a PCell and an SCell). The L1/L2 mobility may involve a case in which a target PCell and target SCell(s) are not a current serving cell. The carrier aggregation scenario may involve a PCell change. In some cases, the L1/L2 mobility may support a carrier aggregation scenario involving a PCell change without an SCell change, and/or a carrier aggregation scenario involving a PCell change with an SCell change. In some cases, in the L1/L2 mobility, a target PCell/SCell may be a current PCell/SCell. In other words, the current PCell/SCell may be configured as candidate target cells. Further, the L1/L2 mobility may be triggered based at least in part on L1 measurements.

Figure 6:
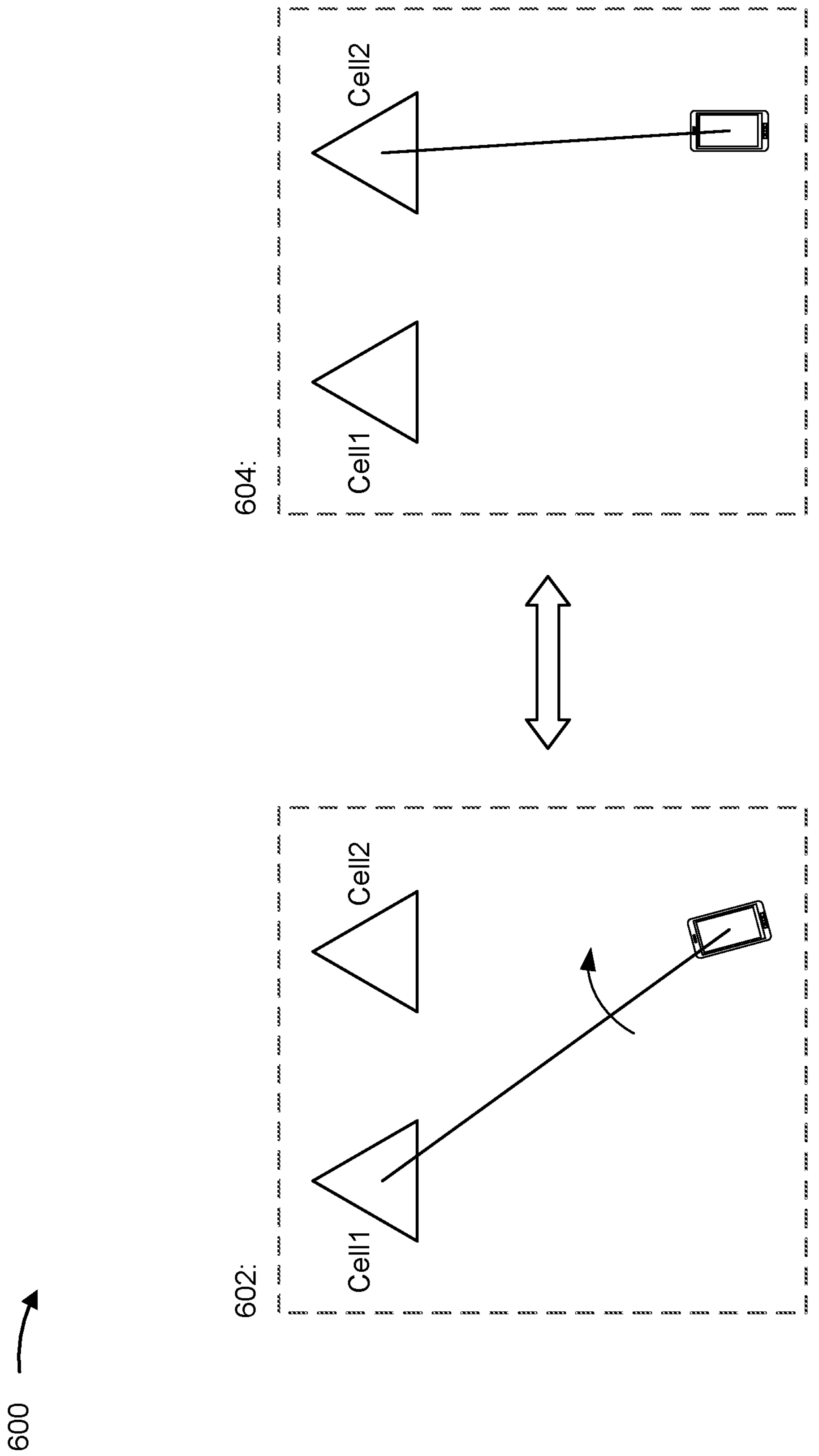
FIG. 6 is a diagram illustrating an example of a cell that is a serving cell or an LTM cell, in accordance with the present disclosure.

FIG. 6 is a diagram illustrating an example 600 of a cell that is a serving cell or an LTM cell, in accordance with the present disclosure.

In a first scenario, a cell may be either a serving cell or an LTM cell. In a default case, separate measurement and reporting configurations may be used when the cell is the serving cell versus when the cell is the LTM cell.

As shown by reference number 602, when a UE is served on a first cell (Cell1), the UE may perform L1 measurements and reporting of the first cell. The first cell may be a serving cell for the UE. When a second cell (Cell2) is configured as a candidate LTM cell, the UE may also perform L1 measurements and reporting of the second cell. The UE may perform channel state information (CSI) measurements and reporting of the first cell based at least in part on a CSI measurement configuration associated with a serving cell configuration of the first cell. The UE may follow an LTM-specific configuration for L1 measurements and reporting of the second cell, which may be the candidate LTM cell.

As shown by reference number 604, after an LTM execution, the second cell may become the serving cell, which may be measured and reported by the UE based at least in part on a corresponding new serving cell configuration. With a subsequent LTM supported, the first cell may become a candidate LTM cell. The UE may follow the LTM-specific configuration for L1 measurements and reporting of the first cell.

As indicated above, FIG. 6 is provided as an example. Other examples may differ from what is described with regard to FIG. 6.

Figure 7:
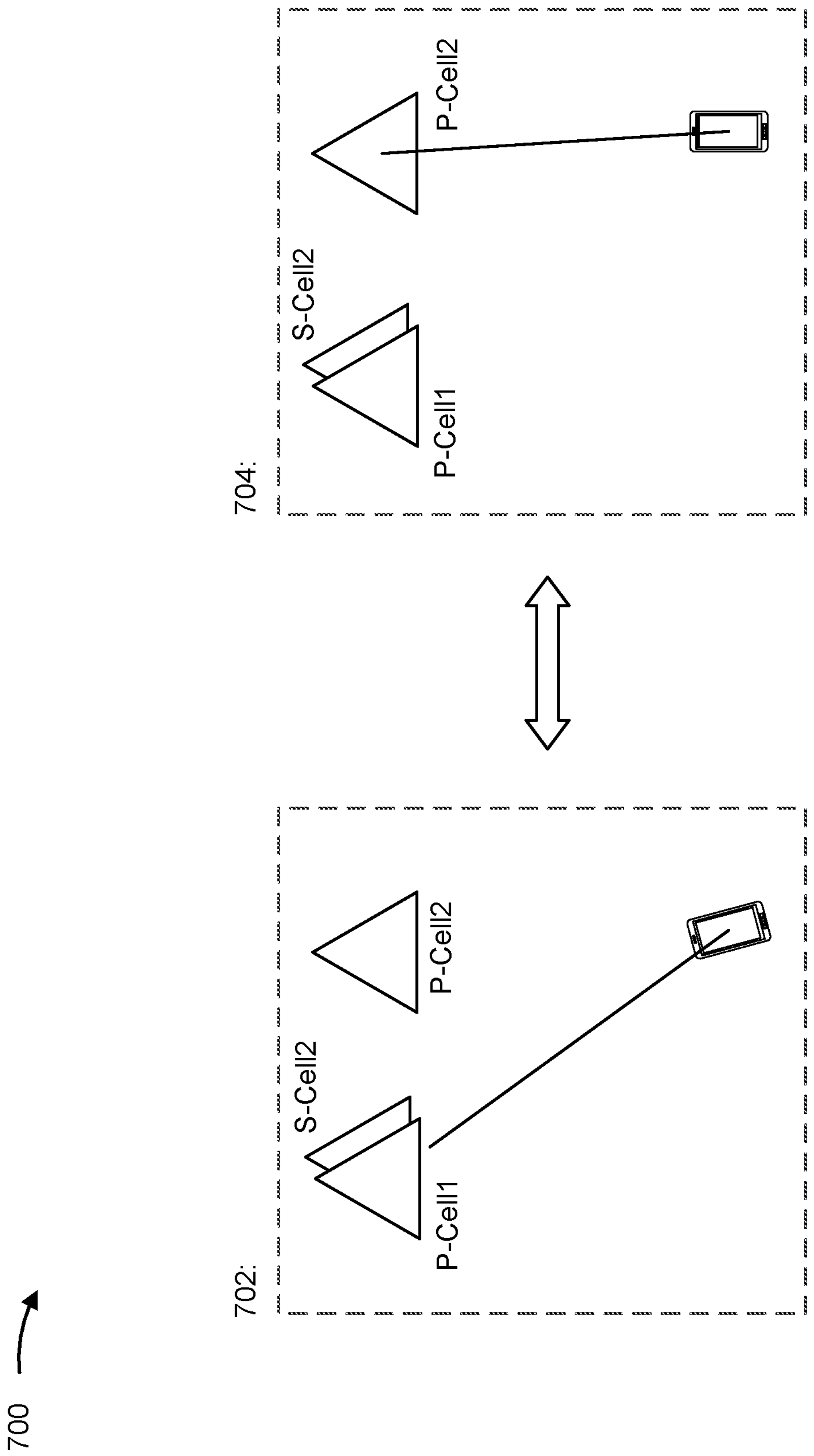
FIG. 7 is a diagram illustrating an example of a cell that is both a serving cell and an LTM cell, in accordance with the present disclosure.

FIG. 7 is a diagram illustrating an example 700 of a cell that is both a serving cell and an LTM cell, in accordance with the present disclosure.

In a second scenario, a cell may be both a serving cell and an LTM cell. A target PCell/SCell may be a current PCell/SCell. In other words, the current PCell/SCell may be configured as a candidate LTM target cell.

As shown by reference number 702, a UE may be associated with a primary first cell (P-Cell1) and a secondary second cell (S-Cell2). A primary second cell (P-Cell2) may be a candidate LTM target cell. In other words, a second cell may be a serving SCell and a candidate LTM PCell, and a first cell may be a serving PCell. A network node may serve the first cell and the second cell, and in a first configuration, the second cell may be the serving SCell and the candidate LTM PCell, and the first cell may be the serving PCell.

As shown by reference number 704, after an LTM execution, the UE may be associated with the primary second cell (P-Cell2). The primary first cell (P-Cell1) and the secondary second cell (S-Cell2) may be candidate LTM target cells. In other words, the second cell may be the serving PCell and a candidate LTM SCell, and the first cell may be a candidate LTM PCell. The network node may serve the first cell and the second cell, and in a second configuration, the second cell may be the serving PCell and the candidate LTM SCell, and the first cell may be the candidate LTM PCell. The UE may switch between the first configuration and the second configuration based at least in part on the LTM execution.

In some cases, a cell may be both a serving PCell and a candidate LTM PCell. Alternatively, a cell may be both a serving SCell and a candidate LTM SCell.

As indicated above, FIG. 7 is provided as an example. Other examples may differ from what is described with regard to FIG. 7.

A cell may be both a serving cell and a candidate LTM cell. For example, the cell may be a serving SCell and a candidate LTM PCell. Alternatively, the cell may be a serving PCell and a candidate LTM SCell. However, a UE that is associated with the cell may not be configured for L1 measurements and reporting of the cell. In other words, when the cell is both the serving cell and the candidate LTM cell at the same time instance, L1 measurements and reporting may not be configured to the UE for the cell. Further, a mechanism for configuring the UE to perform the L1 measurements and reporting of the cell and an associated UE behavior may not be defined. As a result, the UE may be unable to perform L1 measurements for the cell and report the L1 measurements for the cell, which may degrade a performance of the UE when an LTM cell switch is needed (e.g., due to poor network conditions) but may not be triggered due to the lack of L1 measurements and reporting.

In various aspects of techniques and apparatuses described herein, a UE may receive, from a network node, a configuration of a cell that is a serving cell and a candidate LTM cell. The cell may be a serving PCell and the candidate LTM cell may be a candidate LTM SCell. Alternatively, the cell may be a serving SCell and the candidate LTM cell may be a candidate LTM PCell. The serving SCell may be activated or deactivated. The UE may receive, from the network node, a measurement or reporting configuration for the cell that is the serving cell and the candidate LTM cell.

In some cases, the UE may receive a measurement and reporting configuration for the cell that is the serving PCell and the candidate LTM SCell, or for the cell that is the serving SCell and the candidate LTM PCell. The measurement and reporting configuration may be a single measurement and reporting configuration or multiple measurement and reporting configurations. The UE may transmit, to the network node, a measurement report based at least in part on the measurement or reporting configuration. As a result, the UE may be able to perform measurements for the cell and report the measurements for the cell when the cell is both the serving cell and the candidate LTM cell, which may improve a performance of the UE. The measurements and reporting of the cell may enable the network node to perform a cell switch for the UE, which may improve a performance of the UE. In other words, when the UE needs to switch to another cell to have favorable coverage, the network node may be able to initiate the cell switch because the network node receives the measurements from the UE.

Figure 8:
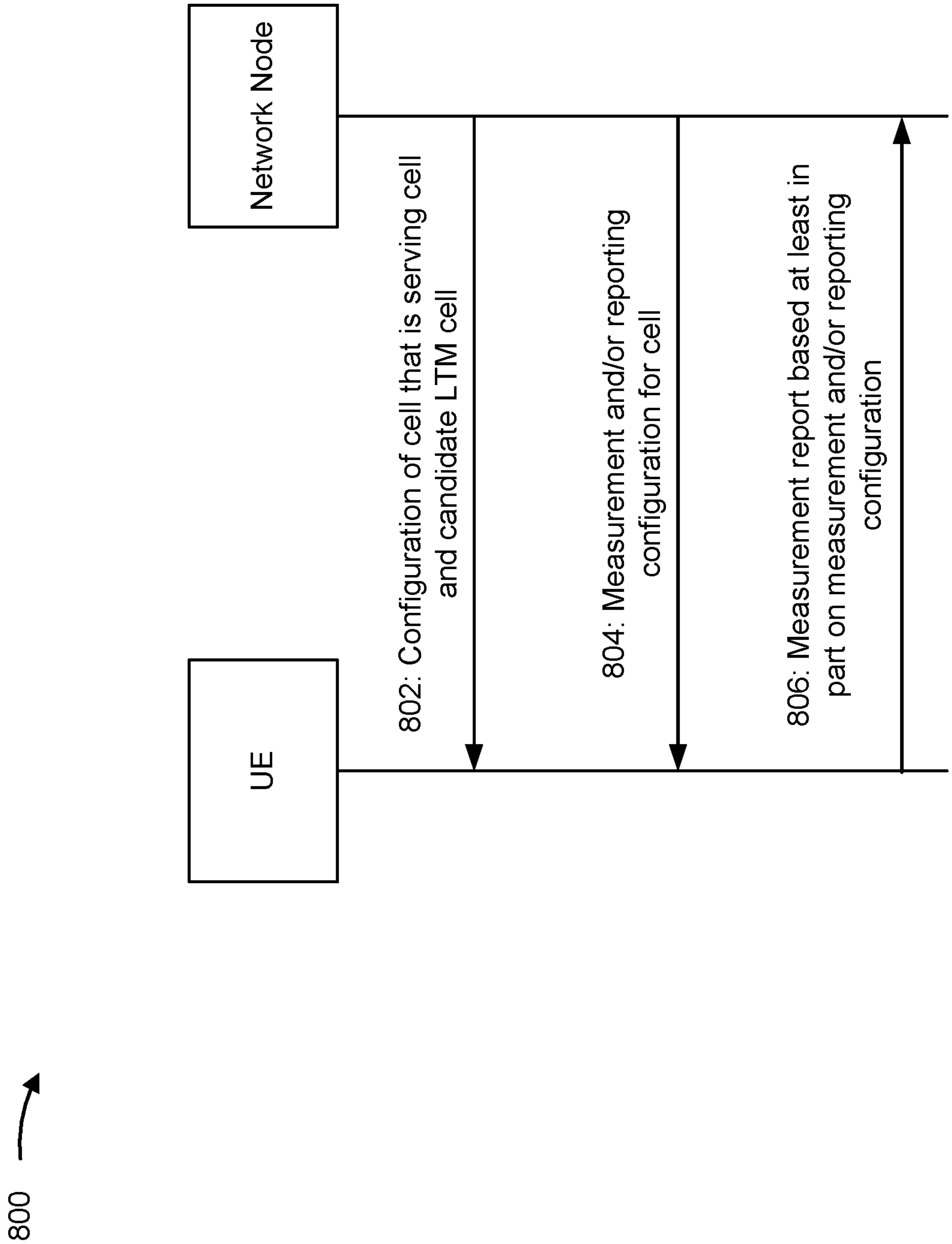
FIG. 8 is a diagram illustrating an example associated with measurement and reporting for serving and candidate cells, in accordance with the present disclosure.

FIG. 8 is a diagram illustrating an example 800 associated with measurement and reporting for serving and candidate cells, in accordance with the present disclosure. As shown in FIG. 8, example 800 includes communication between a UE (e.g., UE 120) and a network node (e.g., network node 110). In some aspects, the UE and the network node may be included in a wireless network, such as wireless network 100.

As shown by reference number 802, the UE may receive, from the network node, a configuration of a cell that is a serving cell and a candidate LTM cell. The configuration may indicate that the cell is a serving PCell and the candidate LTM cell is a candidate LTM SCell. Alternatively, the configuration may indicate that the cell is a serving SCell and the candidate LTM cell is a candidate LTM PCell. The serving SCell may be an activated serving SCell or a deactivated serving SCell.

As shown by reference number 804, the UE may receive, from the network node, a measurement and/or reporting configuration for the cell that is the serving cell and the candidate LTM cell. The measurement and/or reporting configuration may configure the UE to perform measurements associated with the cell and/or to report the measurements associated with the cell.

In some aspects, the measurement and/or reporting configuration may be a single measurement and/or reporting configuration based at least in part on the cell being the serving PCell and the candidate LTM cell, or based at least in part on the cell being the serving SCell and the candidate LTM cell. The measurement and/or reporting configuration may be associated with a serving configuration of the cell, or the measurement and/or reporting configuration may be an LTM-specific configuration of the cell.

In some aspects, the UE may be a first UE. The measurement and/or reporting configuration that is associated with the serving configuration of the cell may be used for the first UE. The measurement and/or reporting configuration that is the LTM-specific configuration of the cell may be used for a second UE. In some aspects, the measurement and/or reporting configuration that is associated with the serving configuration of the cell may be used for the UE at a first time, and the measurement and/or reporting configuration that is the LTM-specific configuration of the cell may be used for the UE at a second time.

In some aspects, the cell may be the serving PCell and the candidate LTM SCell (or candidate LTM cell) (as previously shown by reference number 704). For example, the UE may be associated with a primary second cell (P-Cell2), which may act as the serving PCell. A secondary second cell (S-Cell2) may be the candidate LTM SCell. In this example, a second cell may be both the serving PCell and the candidate LTM SCell. The UE may perform a measurement and reporting of the second cell based at least in part on the second cell being the serving PCell and the candidate LTM SCell.

In some aspects, when the cell is the serving PCell and the candidate LTM SCell, the network node may provide the single measurement and/or reporting configuration for the cell that is the serving PCell and the candidate LTM SCell. The single measurement and/or reporting configuration may be part of the serving configuration of the cell. Alternatively, the single measurement and/or reporting configuration may be the LTM-specific configuration of the cell. The UE may follow the single measurement and/or reporting configuration, based at least in part on the cell being configured as both the serving PCell and the candidate LTM SCell.

In some aspects, the network node may use the single measurement and/or reporting configuration being part of the serving configuration for one UE, and the network node may use the single measurement and/or reporting configuration being the LTM-specific configuration for another UE. In some aspects, the network node may use the single measurement and/or reporting configuration being part of the serving configuration for the UE in one time, and the network node may use the single measurement and/or reporting configuration being part of the LTM-specific configuration for the UE in another time.

In some aspects, the measurement and/or reporting configuration may be two separate measurement and/or reporting configurations based at least in part on the cell being the serving PCell and the candidate LTM cell, or based at least in part on the cell being the serving SCell and the candidate LTM cell. A first measurement and/or reporting configuration, of the two separate measurement and/or reporting configurations, may be associated with the serving configuration of the cell. A second measurement and/or reporting configuration, of the two separate measurement and/or reporting configurations, may be the LTM-specific configuration of the cell.

In some aspects, the UE may activate one or more of the first measurement and/or reporting configuration or the second measurement and/or reporting configuration. The UE may transmit, to the network node, an indication that one or more of the first measurement and/or reporting configuration or the second measurement and/or reporting configuration is activated. In some aspects, the UE may receive, from the network node, an indication to activate one or more of the first measurement and/or reporting configuration or the second measurement and/or reporting configuration.

In some aspects, when the cell is the serving PCell and the candidate LTM SCell, the network node may provide the separate measurement and/or reporting configurations for the cell that is the serving PCell and the candidate LTM SCell. The first measurement and/or reporting configuration may be part of the serving configuration of the cell, and the second measurement and/or reporting configuration may be part of the LTM-specific configuration of the cell. The UE may activate both the first measurement and/or reporting configuration and the second measurement and/or reporting configuration. The UE may select and activate the first measurement and/or reporting configuration or the second measurement and/or reporting configuration, which may change over time depending on a change in network conditions. The UE may indicate, to the network node, whether the first measurement and/or reporting configuration and/or the second measurement and/or reporting configuration are activated. In some aspects, the UE may receive, from the network node, an indication of whether the first measurement and/or reporting configuration and/or the second measurement and/or reporting configuration should be activated by the UE. The indication may be received via RRC signaling, or the indication may be received in a more dynamic manner.

In some aspects, the cell may be a serving SCell and a candidate LTM PCell (or candidate LTM cell) (as previously shown by reference number 702). For example, the UE may be associated with a primary first cell (P-Cell1), which may act as a serving PCell, and a secondary second cell (SCell-2). A primary second cell (P-Cell2) may be the candidate LTM PCell. In this example, a second cell may be both the serving SCell and the candidate LTM PCell. In some aspects, when the serving SCell (e.g., SCell-2) is activated, the UE may perform a measurement and reporting of the cell based at least in part on the cell being the activated serving SCell and the candidate LTM PCell. The serving SCell may be activated due to a UE bandwidth requirement. In some aspects, when the serving SCell (e.g., SCell-2) is deactivated, the UE may cancel measurement and/or reporting of the cell that includes the deactivated serving SCell, even when the cell is the candidate LTM PCell. Alternatively, the UE may still measure the cell for the purpose of LTM. For example, the UE may still measure the deactivated serving SCell (e.g., SCell-2) and the candidate LTM PCell (e.g., SCell-2) for the purpose of LTM. The serving SCell may be deactivated due to the UE bandwidth requirement. The serving SCell may be activated or deactivated due to the UE bandwidth requirement, as opposed to the serving PCell, which may always be activated.

In some aspects, when the cell is the activated serving SCell and the candidate LTM PCell, the network node may provide a single measurement and/or reporting configuration for the cell that is the activated serving SCell and the candidate LTM PCell. The single measurement and/or reporting configuration may be part of the serving configuration of the cell. Alternatively, the single measurement and/or reporting configuration may be the LTM-specific configuration of the cell. The UE may follow the single measurement and/or reporting configuration, based at least in part on the cell being configured as both the activated serving SCell and the candidate LTM PCell.

In some aspects, the network node may use the single measurement and/or reporting configuration being part of the serving configuration for one UE, and the network node may use the single measurement and/or reporting configuration being the LTM-specific configuration for another UE. In some aspects, the network node may use the single measurement and/or reporting configuration being part of the serving configuration for the UE in one time, and the network node may use the single measurement and/or reporting configuration being part of the LTM-specific configuration for the UE in another time.

In some aspects, when the cell is the activated serving SCell and the candidate LTM PCell, the network node may provide separate measurement and/or reporting configurations for the cell that is the activated serving SCell and the candidate LTM PCell. The first measurement and/or reporting configuration may be part of the serving configuration of the cell, and the second measurement and/or reporting configuration may be part of the LTM-specific configuration of the cell. The UE may activate both the first measurement and/or reporting configuration and the second measurement and/or reporting configuration. The UE may select and activate the first measurement and/or reporting configuration or the second measurement and/or reporting configuration, which may change over time depending on a change in network conditions. The UE may indicate, to the network node, whether the first measurement and/or reporting configuration and/or the second measurement and/or reporting configuration are activated. In some aspects, the UE may receive, from the network node, an indication of whether the first measurement and/or reporting configuration and/or the second measurement and/or reporting configuration should be activated by the UE. The indication may be received via RRC signaling, or the indication may be received in a more dynamic manner.

In some aspects, when the cell is the serving SCell and the candidate LTM cell, and when the serving SCell is the deactivated serving SCell, the UE may determine to not perform measurements and/or reporting for the serving SCell based at least in part on the serving SCell being the deactivated serving SCell. Alternatively, the UE may determine to perform measurements and/or reporting for the serving SCell based at least in part on the serving SCell being the deactivated serving SCell. In some aspects, the measurement and/or reporting configuration may be associated with the serving configuration of the cell based at least in part on the serving SCell being deactivated. The measurement and/or reporting configuration may be the LTM-specific configuration of the cell based at least in part on the serving SCell being deactivated. Further, the measurement and/or reporting configuration may be based at least in part on the serving SCell being deactivated.

In some aspects, when the cell is the deactivated serving SCell and the candidate LTM PCell, the UE may not perform measurements and/or reporting of the deactivated serving SCell, even when the cell is also the candidate LTM PCell. In this case, the UE may not transmit a CSI measurement report for the deactivated serving SCell. The serving SCell may need to be activated before LTM may be triggered because no CSI measurement report is available for the serving SCell.

In some aspects, when the cell is the deactivated serving SCell and the candidate LTM PCell, the UE may perform measurements and/or reporting of the deactivated serving SCell. The UE may use a configuration that is part of the serving configuration of the cell to perform the measurements and/or reporting of the deactivated serving SCell. The UE may use the same configuration as when the serving SCell is activated to perform the measurements and/or reporting of the deactivated serving SCell. The configuration that is part of the serving configuration of the cell may be associated with a single measurement and/or reporting configuration for the cell, or may be one of separate measurement and/or reporting configurations for the cell. Alternatively, the UE may use the LTM-specific configuration of the cell to perform the measurements and/or reporting of the deactivated serving SCell. The LTM-specific configuration may be associated with the single measurement and/or reporting configuration for the cell, or may be one of the separate measurement and/or reporting configurations for the cell.

In some aspects, the UE may receive, from the network node, the measurement and/or reporting configuration, which may be specific to measuring and/or reporting the serving SCell in a deactivation state. In other words, the measurement and/or reporting configuration may be for measuring and/or reporting the deactivated serving SCell. The measurement and/or reporting configuration may be associated with the single measurement and/or reporting configuration for the cell, or may be one of the separate measurement and/or reporting configurations for the cell.

As shown by reference number 806, the UE may transmit, to the network node, a measurement report based at least in part on the measurement or reporting configuration. The UE may transmit the measurement report for the cell that is the serving cell and the candidate LTM cell. For example, the UE may transmit the measurement report for the cell that is the serving PCell and the candidate LTM SCell. Alternatively, the UE may transmit the measurement report for the cell that is the serving SCell and the candidate LTM PCell, where the serving SCell may be the activated serving SCell or the deactivated serving SCell.

As indicated above, FIG. 8 is provided as an example. Other examples may differ from what is described with regard to FIG. 8.

Figure 9:
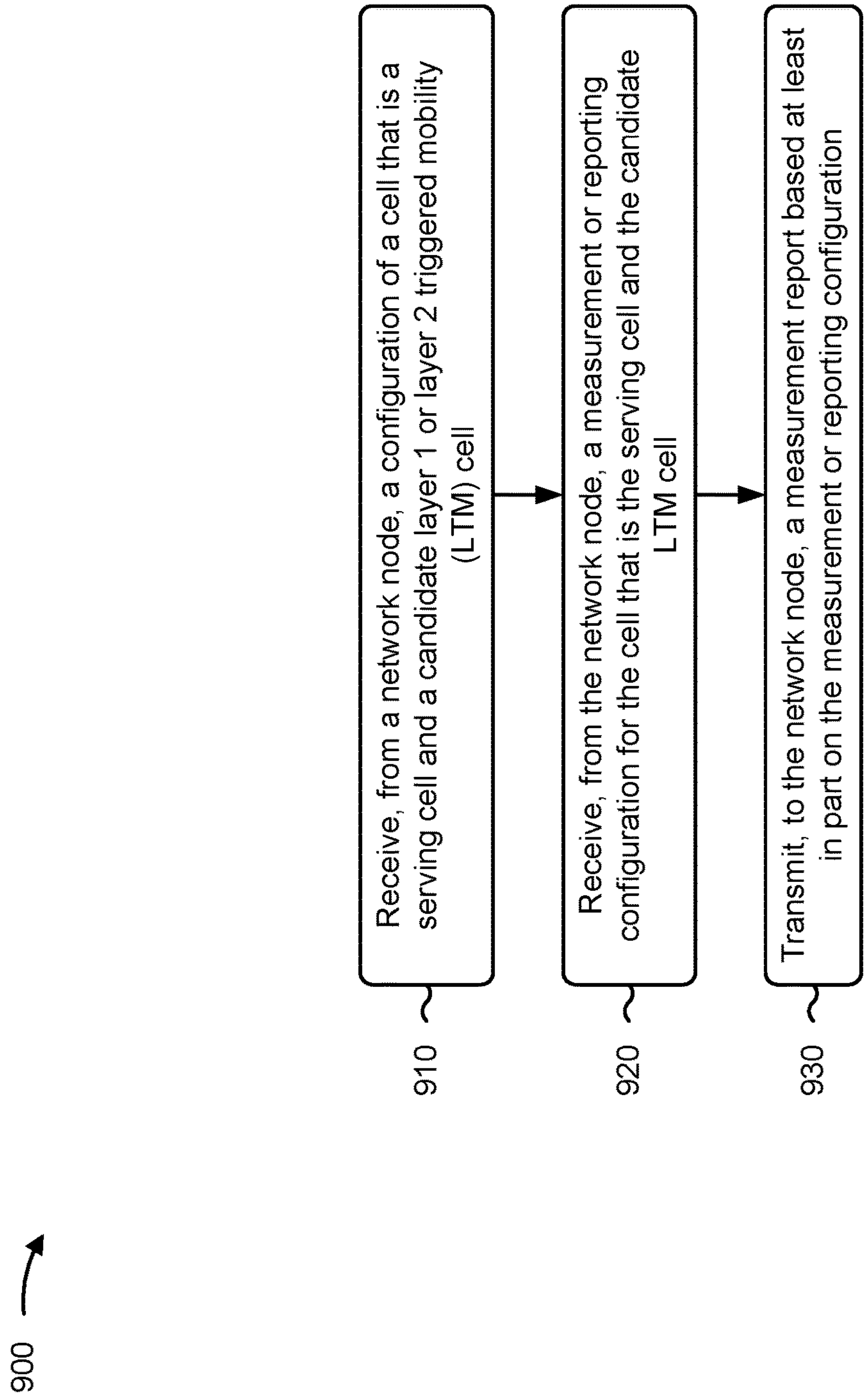
FIGS. 9-10 are diagrams illustrating example processes associated with measurement and reporting for serving and candidate cells, in accordance with the present disclosure.

FIG. 9 is a diagram illustrating an example process 900 performed, for example, by a UE, in accordance with the present disclosure. Example process 900 is an example where the UE (e.g., UE 120) performs operations associated with measurement and reporting for serving and candidate cells.

As shown in FIG. 9, in some aspects, process 900 may include receiving, from a network node, a configuration of a cell that is a serving cell and a candidate LTM cell (block 910). For example, the UE (e.g., using reception component 1102 and/or communication manager 1106, depicted in FIG. 11) may receive, from a network node, a configuration of a cell that is a serving cell and a candidate LTM cell, as described above.

As further shown in FIG. 9, in some aspects, process 900 may include receiving, from the network node, a measurement or reporting configuration for the cell that is the serving cell and the candidate LTM cell (block 920). For example, the UE (e.g., using reception component 1102 and/or communication manager 1106, depicted in FIG. 11) may receive, from the network node, a measurement or reporting configuration for the cell that is the serving cell and the candidate LTM cell, as described above.

As further shown in FIG. 9, in some aspects, process 900 may include transmitting, to the network node, a measurement report based at least in part on the measurement or reporting configuration (block 930). For example, the UE (e.g., using transmission component 1104 and/or communication manager 1106, depicted in FIG. 11) may transmit, to the network node, a measurement report based at least in part on the measurement or reporting configuration, as described above.

Process 900 may include additional aspects, such as any single aspect or any combination of aspects described below and/or in connection with one or more other processes described elsewhere herein.

In a first aspect, the cell is a serving PCell and the candidate LTM cell is a candidate LTM SCell, or the cell is a serving SCell and the candidate LTM cell is a candidate LTM PCell, and the serving SCell is an activated serving SCell.

In a second aspect, alone or in combination with the first aspect, the measurement or reporting configuration is a single measurement or reporting configuration based at least in part on the cell being the serving PCell and the candidate LTM cell, or based at least in part on the cell being the serving SCell and the candidate LTM cell.

In a third aspect, alone or in combination with one or more of the first and second aspects, the measurement or reporting configuration is associated with a serving configuration of the cell, or the measurement or reporting configuration is an LTM-specific configuration of the cell.

In a fourth aspect, alone or in combination with one or more of the first through third aspects, the UE is a first UE, the measurement or reporting configuration that is associated with the serving configuration of the cell is used for the first UE, and the measurement or reporting configuration that is the LTM-specific configuration of the cell is used for a second UE.

In a fifth aspect, alone or in combination with one or more of the first through fourth aspects, the measurement or reporting configuration that is associated with the serving configuration of the cell is used for the UE at a first time, and the measurement or reporting configuration that is the LTM-specific configuration of the cell is used for the UE at a second time.

In a sixth aspect, alone or in combination with one or more of the first through fifth aspects, the measurement or reporting configuration is two separate measurement or reporting configurations based at least in part on the cell being the serving PCell and the candidate LTM cell, or based at least in part on the cell being the serving SCell and the candidate LTM cell.

In a seventh aspect, alone or in combination with one or more of the first through sixth aspects, a first measurement or reporting configuration, of the two separate measurement or reporting configurations, is associated with a serving configuration of the cell, and a second measurement or reporting configuration, of the two separate measurement or reporting configurations, is an LTM-specific configuration of the cell.

In an eighth aspect, alone or in combination with one or more of the first through seventh aspects, process 900 includes activating one or more of the first measurement or reporting configuration or the second measurement or reporting configuration.

In a ninth aspect, alone or in combination with one or more of the first through eighth aspects, process 900 includes transmitting, to the network node, an indication that one or more of the first measurement or reporting configuration or the second measurement or reporting configuration is activated.

In a tenth aspect, alone or in combination with one or more of the first through ninth aspects, process 900 includes receiving, from the network node, an indication to activate one or more of the first measurement or reporting configuration or the second measurement or reporting configuration.

In an eleventh aspect, alone or in combination with one or more of the first through tenth aspects, the cell is a serving SCell and the candidate LTM cell is a candidate LTM PCell, and the serving SCell is a deactivated serving SCell.

In a twelfth aspect, alone or in combination with one or more of the first through eleventh aspects, process 900 includes determining to not perform measurements or reporting for the serving SCell based at least in part on the serving SCell being the deactivated serving SCell and the candidate LTM cell.

In a thirteenth aspect, alone or in combination with one or more of the first through twelfth aspects, process 900 includes determining to perform measurements or reporting for the serving SCell based at least in part on the serving SCell being the deactivated serving SCell and the candidate LTM cell.

In a fourteenth aspect, alone or in combination with one or more of the first through thirteenth aspects, the measurement or reporting configuration is associated with a serving configuration of the cell based at least in part on the serving SCell being deactivated, or the measurement or reporting configuration is an LTM-specific configuration of the cell based at least in part on the serving SCell being deactivated.

In a fifteenth aspect, alone or in combination with one or more of the first through fourteenth aspects, the measurement or reporting configuration is based at least in part on the serving SCell being deactivated.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
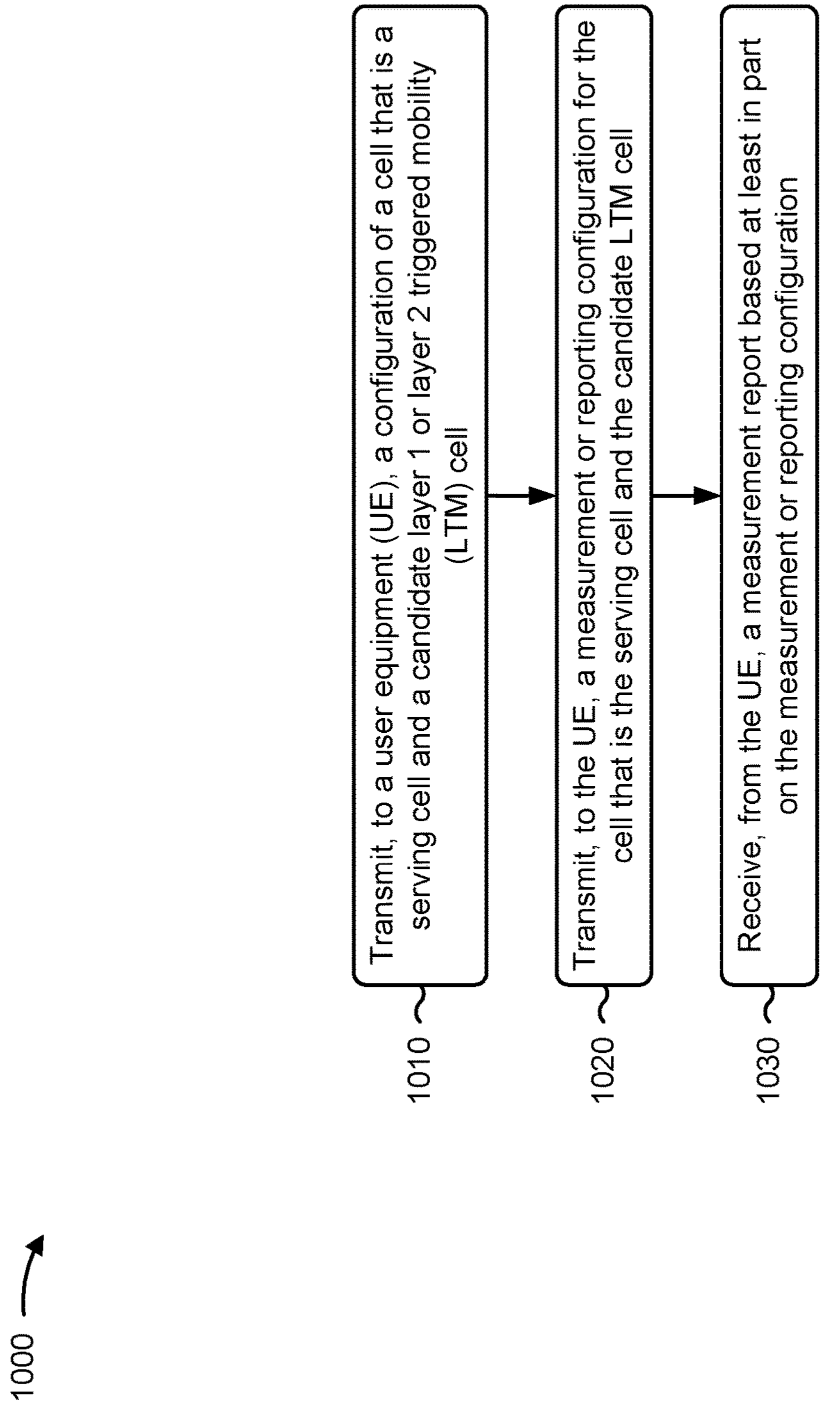

FIG. 10 is a diagram illustrating an example process 1000 performed, for example, by a network node, in accordance with the present disclosure. Example process 1000 is an example where the network node (e.g., network node 110) performs operations associated with measurement and reporting for serving and candidate cells.

As shown in FIG. 10, in some aspects, process 1000 may include transmitting, to a UE, a configuration of a cell that is a serving cell and a candidate LTM cell (block 1010). For example, the network node (e.g., using transmission component 1204 and/or communication manager 1206, depicted in FIG. 12) may transmit, to a UE, a configuration of a cell that is a serving cell and a candidate LTM cell, as described above.

As further shown in FIG. 10, in some aspects, process 1000 may include transmitting, to the UE, a measurement or reporting configuration for the cell that is the serving cell and the candidate LTM cell (block 1020). For example, the network node (e.g., using transmission component 1204 and/or communication manager 1206, depicted in FIG. 12) may transmit, to the UE, a measurement or reporting configuration for the cell that is the serving cell and the candidate LTM cell, as described above.

As further shown in FIG. 10, in some aspects, process 1000 may include receiving, from the UE, a measurement report based at least in part on the measurement or reporting configuration (block 1030). For example, the network node (e.g., using reception component 1202 and/or communication manager 1206, depicted in FIG. 12) may receive, from the UE, a measurement report based at least in part on the measurement or reporting configuration, as described above.

Process 1000 may include additional aspects, such as any single aspect or any combination of aspects described below and/or in connection with one or more other processes described elsewhere herein.

In a first aspect, the cell is a serving PCell and the candidate LTM cell is a candidate LTM SCell, or the cell is a serving SCell and the candidate LTM cell is a candidate LTM PCell, and the serving SCell is an activated serving SCell.

In a second aspect, alone or in combination with the first aspect, the measurement or reporting configuration is a single measurement or reporting configuration based at least in part on the cell being the serving PCell and the candidate LTM cell, or based at least in part on the cell being the serving SCell and the candidate LTM cell.

In a third aspect, alone or in combination with one or more of the first and second aspects, the measurement or reporting configuration is associated with a serving configuration of the cell, or the measurement or reporting configuration is an LTM-specific configuration of the cell.

In a fourth aspect, alone or in combination with one or more of the first through third aspects, the UE is a first UE, the measurement or reporting configuration that is associated with the serving configuration of the cell is used for the first UE, and the measurement or reporting configuration that is the LTM-specific configuration of the cell is used for a second UE.

In a fifth aspect, alone or in combination with one or more of the first through fourth aspects, the measurement or reporting configuration that is associated with the serving configuration of the cell is used for the UE at a first time, and the measurement or reporting configuration that is the LTM-specific configuration of the cell is used for the UE at a second time.

In a sixth aspect, alone or in combination with one or more of the first through fifth aspects, the measurement or reporting configuration is two separate measurement or reporting configurations based at least in part on the cell being the serving PCell and the candidate LTM cell, or based at least in part on the cell being the serving SCell and the candidate LTM cell.

In a seventh aspect, alone or in combination with one or more of the first through sixth aspects, a first measurement or reporting configuration, of the two separate measurement or reporting configurations, is associated with a serving configuration of the cell, and a second measurement or reporting configuration, of the two separate measurement or reporting configurations, is an LTM-specific configuration of the cell.

In an eighth aspect, alone or in combination with one or more of the first through seventh aspects, process 1000 includes receiving, from the UE, an indication that one or more of the first measurement or reporting configuration or the second measurement or reporting configuration is activated.

In a ninth aspect, alone or in combination with one or more of the first through eighth aspects, process 1000 includes receiving, from the network node, an indication to activate one or more of the first measurement or reporting configuration or the second measurement or reporting configuration.

In a tenth aspect, alone or in combination with one or more of the first through ninth aspects, the cell is a serving SCell and the candidate LTM cell is a candidate LTM PCell, and the serving SCell is a deactivated serving SCell.

In an eleventh aspect, alone or in combination with one or more of the first through tenth aspects, measurements or reporting are not performed for the serving SCell based at least in part on the serving SCell being the deactivated serving SCell and the candidate LTM cell.

In a twelfth aspect, alone or in combination with one or more of the first through eleventh aspects, measurements or reporting are performed based at least in part on the serving SCell being the deactivated serving SCell and the candidate LTM cell.

In a thirteenth aspect, alone or in combination with one or more of the first through twelfth aspects, the measurement or reporting configuration is associated with a serving configuration of the cell based at least in part on the serving SCell being deactivated, or the measurement or reporting configuration is an LTM-specific configuration of the cell based at least in part on the serving SCell being deactivated.

In a fourteenth aspect, alone or in combination with one or more of the first through thirteenth aspects, the measurement or reporting configuration is based at least in part on the serving SCell being deactivated.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
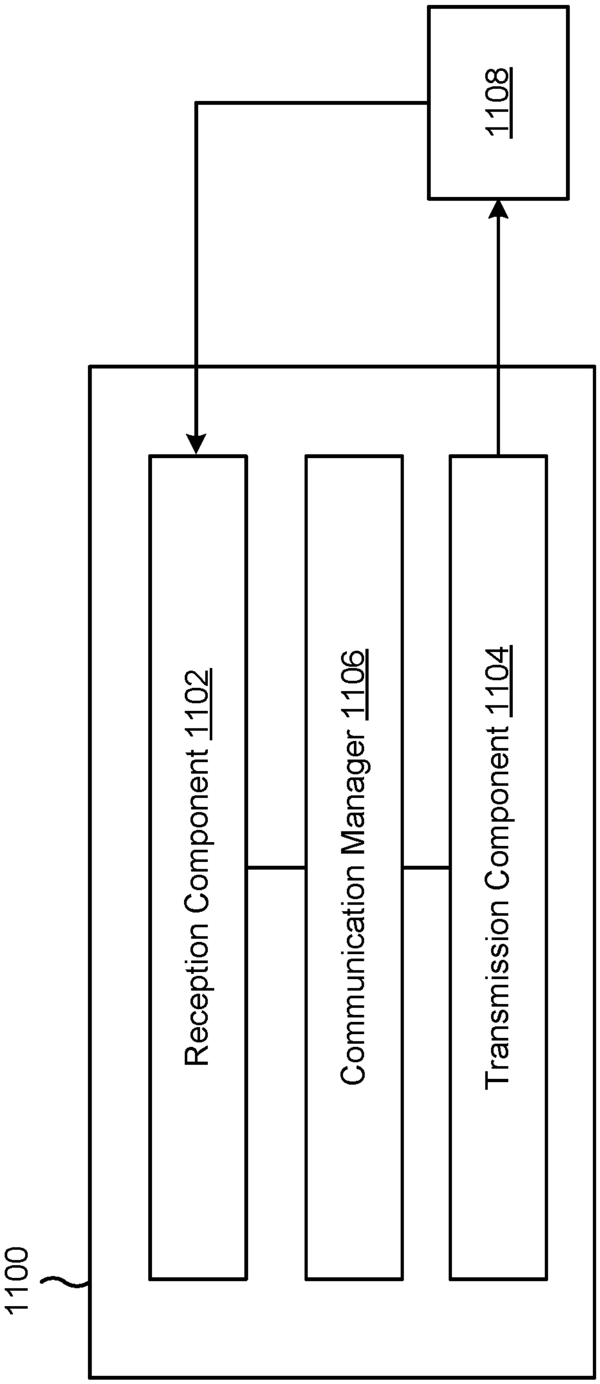
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a network node, a configuration of a cell that is a serving cell and a candidate LTM cell. The reception component 1102 may receive, from the network node, a measurement or reporting configuration for the cell that is the serving cell and the candidate LTM cell. The transmission component 1104 may transmit, to the network node, a measurement report based at least in part on the measurement or reporting configuration.

The communication manager 1106 may activate one or more of the first measurement or reporting configuration or the second measurement or reporting configuration. The transmission component 1104 may transmit, to the network node, an indication that one or more of the first measurement or reporting configuration or the second measurement or reporting configuration is activated. The reception component 1102 may receive, from the network node, an indication to activate one or more of the first measurement or reporting configuration or the second measurement or reporting configuration. The communication manager 1106 may determine to not perform measurements or reporting for the serving SCell based at least in part on the serving SCell being the deactivated serving SCell and the candidate LTM cell. The communication manager 1106 may determine to perform measurements or reporting for the serving SCell based at least in part on the serving SCell being the deactivated serving SCell and the candidate LTM cell.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
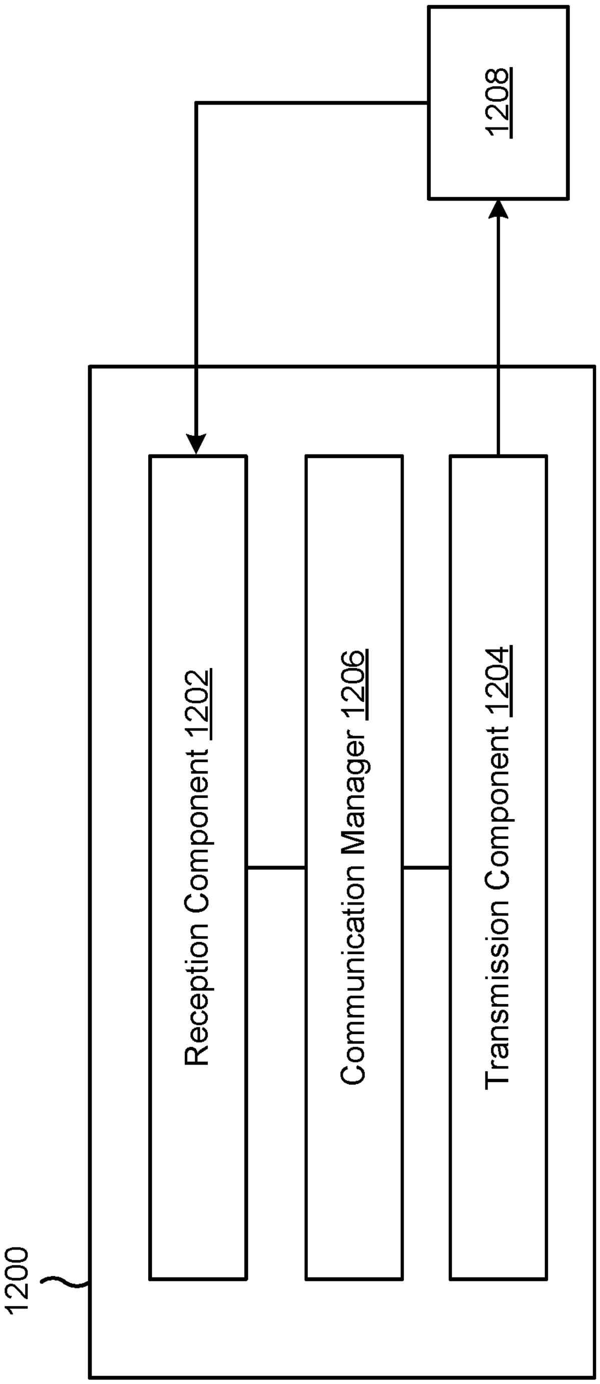

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a UE, a configuration of a cell that is a serving cell and a candidate LTM cell. The transmission component 1204 may transmit, to the UE, a measurement or reporting configuration for the cell that is the serving cell and the candidate LTM cell. The reception component 1202 may receive, from the UE, a measurement report based at least in part on the measurement or reporting configuration.

The reception component 1202 may receive, from the UE, an indication that one or more of the first measurement or reporting configuration or the second measurement or reporting configuration is activated. The reception component 1202 may receive, from the network node, an indication to activate one or more of the first measurement or reporting configuration or the second measurement or reporting configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a network node, a configuration of a cell that is a serving cell and a candidate layer 1 or layer 2 triggered mobility (LTM) cell; receiving, from the network node, a measurement or reporting configuration for the cell that is the serving cell and the candidate LTM cell; and transmitting, to the network node, a measurement report based at least in part on the measurement or reporting configuration.

Aspect 2: The method of Aspect 1, wherein: the cell is a serving primary cell (PCell) and the candidate LTM cell is a candidate LTM secondary cell (SCell); or the cell is a serving SCell and the candidate LTM cell is a candidate LTM PCell, and wherein the serving SCell is an activated serving SCell.

Aspect 3: The method of Aspect 2, wherein the measurement or reporting configuration is a single measurement or reporting configuration based at least in part on the cell being the serving PCell and the candidate LTM cell, or based at least in part on the cell being the serving SCell and the candidate LTM cell.

Aspect 4: The method of Aspect 3, wherein: the measurement or reporting configuration is associated with a serving configuration of the cell; or the measurement or reporting configuration is an LTM-specific configuration of the cell.

Aspect 5: The method of Aspect 4, wherein the UE is a first UE, wherein the measurement or reporting configuration that is associated with the serving configuration of the cell is used for the first UE, and wherein the measurement or reporting configuration that is the LTM-specific configuration of the cell is used for a second UE.

Aspect 6: The method of Aspect 5, wherein the measurement or reporting configuration that is associated with the serving configuration of the cell is used for the UE at a first time, and wherein the measurement or reporting configuration that is the LTM-specific configuration of the cell is used for the UE at a second time.

Aspect 7: The method of Aspect 2, wherein the measurement or reporting configuration is two separate measurement or reporting configurations based at least in part on the cell being the serving PCell and the candidate LTM cell, or based at least in part on the cell being the serving SCell and the candidate LTM cell.

Aspect 8: The method of Aspect 7, wherein: a first measurement or reporting configuration, of the two separate measurement or reporting configurations, is associated with a serving configuration of the cell; and a second measurement or reporting configuration, of the two separate measurement or reporting configurations, is an LTM-specific configuration of the cell.

Aspect 9: The method of Aspect 8, further comprising: activating one or more of the first measurement or reporting configuration or the second measurement or reporting configuration.

Aspect 10: The method of Aspect 8, further comprising: transmitting, to the network node, an indication that one or more of the first measurement or reporting configuration or the second measurement or reporting configuration is activated.

Aspect 11: The method of Aspect 8, further comprising: receiving, from the network node, an indication to activate one or more of the first measurement or reporting configuration or the second measurement or reporting configuration.

Aspect 12: The method of any of Aspects 1-11, wherein the cell is a serving SCell and the candidate LTM cell is a candidate LTM PCell, and wherein the serving SCell is a deactivated serving SCell.

Aspect 13: The method of Aspect 12, further comprising: determining to not perform measurements or reporting for the serving SCell based at least in part on the serving SCell being the deactivated serving SCell and the candidate LTM cell.

Aspect 14: The method of Aspect 12, further comprising: determining to perform measurements or reporting for the serving SCell based at least in part on the serving SCell being the deactivated serving SCell and the candidate LTM cell.

Aspect 15: The method of Aspect 14, wherein: the measurement or reporting configuration is associated with a serving configuration of the cell based at least in part on the serving SCell being deactivated; or the measurement or reporting configuration is an LTM-specific configuration of the cell based at least in part on the serving SCell being deactivated.

Aspect 16: The method of Aspect 14, wherein the measurement or reporting configuration is based at least in part on the serving SCell being deactivated.

Aspect 17: A method of wireless communication performed by a network node, comprising: transmitting, to a user equipment (UE), a configuration of a cell that is a serving cell and a candidate layer 1 or layer 2 triggered mobility (LTM) cell; transmitting, to the UE, a measurement or reporting configuration for the cell that is the serving cell and the candidate LTM cell; and receiving, from the UE, a measurement report based at least in part on the measurement or reporting configuration.

Aspect 18: The method of Aspect 17, wherein: the cell is a serving primary cell (PCell) and the candidate LTM cell is a candidate LTM secondary cell (SCell); or the cell is a serving SCell and the candidate LTM cell is a candidate LTM PCell, and wherein the serving SCell is an activated serving SCell.

Aspect 19: The method of Aspect 18, wherein the measurement or reporting configuration is a single measurement or reporting configuration based at least in part on the cell being the serving PCell and the candidate LTM cell, or based at least in part on the cell being the serving SCell and the candidate LTM cell.

Aspect 20: The method of Aspect 19, wherein: the measurement or reporting configuration is associated with a serving configuration of the cell; or the measurement or reporting configuration is an LTM-specific configuration of the cell.

Aspect 21: The method of Aspect 20, wherein the UE is a first UE, wherein the measurement or reporting configuration that is associated with the serving configuration of the cell is used for the first UE, and wherein the measurement or reporting configuration that is the LTM-specific configuration of the cell is used for a second UE.

Aspect 22: The method of Aspect 20, wherein the measurement or reporting configuration that is associated with the serving configuration of the cell is used for the UE at a first time, and wherein the measurement or reporting configuration that is the LTM-specific configuration of the cell is used for the UE at a second time.

Aspect 23: The method of Aspect 18, wherein the measurement or reporting configuration is two separate measurement or reporting configurations based at least in part on the cell being the serving PCell and the candidate LTM cell, or based at least in part on the cell being the serving SCell and the candidate LTM cell.

Aspect 24: The method of Aspect 23, wherein: a first measurement or reporting configuration, of the two separate measurement or reporting configurations, is associated with a serving configuration of the cell; and a second measurement or reporting configuration, of the two separate measurement or reporting configurations, is an LTM-specific configuration of the cell.

Aspect 25: The method of Aspect 24, further comprising: receiving, from the UE, an indication that one or more of the first measurement or reporting configuration or the second measurement or reporting configuration is activated.

Aspect 26: The method of Aspect 24, further comprising: receiving, from the network node, an indication to activate one or more of the first measurement or reporting configuration or the second measurement or reporting configuration.

Aspect 27: The method of any of Aspects 17-26, wherein the cell is a serving SCell and the candidate LTM cell is a candidate LTM PCell, and wherein the serving SCell is a deactivated serving SCell.

Aspect 28: The method of Aspect 27, wherein measurements or reporting are not performed for the serving SCell based at least in part on the serving SCell being the deactivated serving SCell and the candidate LTM cell.

Aspect 29: The method of Aspect 27, wherein measurements or reporting are performed based at least in part on the serving SCell being the deactivated serving SCell and the candidate LTM cell.

Aspect 30: The method of Aspect 29, wherein: the measurement or reporting configuration is associated with a serving configuration of the cell based at least in part on the serving SCell being deactivated; or the measurement or reporting configuration is an LTM-specific configuration of the cell based at least in part on the serving SCell being deactivated.

Aspect 31: The method of Aspect 29, wherein the measurement or reporting configuration is based at least in part on the serving SCell being deactivated.

Aspect 32: An apparatus for wireless communication at a device, comprising a processor; memory coupled with the processor; and instructions stored in the memory and executable by the processor to cause the apparatus to perform the method of one or more of Aspects 1-16.

Aspect 33: A device for wireless communication, comprising a memory and one or more processors coupled to the memory, the one or more processors configured to perform the method of one or more of Aspects 1-16.

Aspect 34: An apparatus for wireless communication, comprising at least one means for performing the method of one or more of Aspects 1-16.

Aspect 35: A non-transitory computer-readable medium storing code for wireless communication, the code comprising instructions executable by a processor to perform the method of one or more of Aspects 1-16.

Aspect 36: A non-transitory computer-readable medium storing a set of instructions for wireless communication, the set of instructions comprising one or more instructions that, when executed by one or more processors of a device, cause the device to perform the method of one or more of Aspects 1-16.

Aspect 37: An apparatus for wireless communication at a device, comprising a processor; memory coupled with the processor; and instructions stored in the memory and executable by the processor to cause the apparatus to perform the method of one or more of Aspects 17-31.

Aspect 38: A device for wireless communication, comprising a memory and one or more processors coupled to the memory, the one or more processors configured to perform the method of one or more of Aspects 17-31.

Aspect 39: An apparatus for wireless communication, comprising at least one means for performing the method of one or more of Aspects 17-31.

Aspect 40: A non-transitory computer-readable medium storing code for wireless communication, the code comprising instructions executable by a processor to perform the method of one or more of Aspects 17-31.

Aspect 41: A non-transitory computer-readable medium storing a set of instructions for wireless communication, the set of instructions comprising one or more instructions that, when executed by one or more processors of a device, cause the device to perform the method of one or more of Aspects 17-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:

one or more antennas; and a processing system that includes one or more processors and one or more memories that store code for the one or more processors, the processing system configured to cause the UE to:

receive, from a network node, a configuration of a cell that is a serving cell and a candidate layer 1 or layer 2 triggered mobility (LTM) cell, wherein:

the cell is a serving primary cell (PCell) and a candidate LTM secondary cell (SCell), or the cell is an activated serving SCell and a candidate LTM PCell;

receive, from the network node, a measurement or reporting configuration, wherein the measurement or reporting configuration comprises two separate measurement or reporting configurations based at least in part on the cell being the serving PCell and the candidate LTM SCell, or based at least in part on the cell being the activated serving SCell and the candidate LTM PCell; and transmit, to the network node, a measurement report based at least in part on the measurement or reporting configuration.

2. The UE of claim 1, wherein:

the UE is a first UE, the measurement or reporting configuration that is associated with a serving configuration of the cell is used for the first UE, and the measurement or reporting configuration that is a LTM-specific configuration of the cell is used for a second UE.

3. The UE of claim 1, wherein the measurement or reporting configuration that is associated with a serving configuration of the cell is used for the UE at a first time, and wherein the measurement or reporting configuration that is a LTM-specific configuration of the cell is used for the UE at a second time.

4. The UE of claim 1, wherein:

a first measurement or reporting configuration, of the two separate measurement or reporting configurations, is associated with a serving configuration of the cell; and a second measurement or reporting configuration, of the two separate measurement or reporting configurations, is an LTM-specific configuration of the cell.

5. The UE of claim 4, wherein the processing system is configured to cause the UE to:

activate one or more of the first measurement or reporting configuration or the second measurement or reporting configuration.

6. The UE of claim 4, wherein the processing system is configured to cause the UE to:

transmit, to the network node, an indication that one or more of the first measurement or reporting configuration or the second measurement or reporting configuration is activated.

7. The UE of claim 4, wherein the processing system is configured to cause the UE to:

receive, from the network node, an indication to activate one or more of the first measurement or reporting configuration or the second measurement or reporting configuration.

8. The UE of claim 1, wherein the cell is a serving SCell and the candidate LTM cell is a candidate LTM PCell, and wherein the serving SCell is a deactivated serving SCell.

9. The UE of claim 8, wherein the processing system is configured to cause the UE to:

determine to not perform measurements or reporting for the serving SCell based at least in part on the serving SCell being the deactivated serving SCell and the candidate LTM cell.

10. The UE of claim 8, wherein the processing system is configured to cause the UE to:

determine to perform measurements or reporting for the serving SCell based at least in part on the serving SCell being the deactivated serving SCell and the candidate LTM cell.

11. The UE of claim 10, wherein:

the measurement or reporting configuration is associated with a serving configuration of the cell based at least in part on the serving SCell being deactivated; or the measurement or reporting configuration is an LTM-specific configuration of the cell based at least in part on the serving SCell being deactivated.

12. The UE of claim 10, wherein the measurement or reporting configuration is based at least in part on the serving SCell being deactivated.

13. A network node, comprising:

one or more antennas; and a processing system that includes one or more processors and one or more memories that store code for the one or more processors, the processing system configured to cause the network node to:

transmit, to a user equipment (UE), a configuration of a cell that is a serving cell and a candidate layer 1 or layer 2 triggered mobility (LTM) cell, wherein the cell is a serving primary cell (PCell) and a candidate LTM secondary cell (SCell), or the cell is an activated serving SCell and a candidate LTM PCell;

transmit, to the UE, a measurement or reporting configuration, wherein the measurement or reporting configuration comprises two separate measurement or reporting configurations based at least in part on the cell being the serving PCell and the candidate LTM SCell, or based at least in part on the cell being the activated serving SCell and the candidate LTM PCell; and receive, from the UE, a measurement report based at least in part on the measurement or reporting configuration.

14. A method of wireless communication performed by a user equipment (UE), comprising:

receiving, from a network node, a configuration of a cell that is a serving cell and a candidate layer 1 or layer 2 triggered mobility (LTM) cell, wherein:

the cell is a serving primary cell (PCell) and a candidate LTM secondary cell (SCell), or the cell is an activated serving SCell and a candidate LTM PCell;

receiving, from the network node, a measurement or reporting configuration, wherein the measurement or reporting configuration comprises two separate measurement or reporting configurations based at least in part on the cell being the serving PCell and the candidate LTM SCell, or based at least in part on the cell being the activated serving SCell and the candidate LTM PCell; and transmitting, to the network node, a measurement report based at least in part on the measurement or reporting configuration.

15. The method of claim 14, wherein:

a first measurement or reporting configuration, of the two separate measurement or reporting configurations, is associated with a serving configuration of the cell; and a second measurement or reporting configuration, of the two separate measurement or reporting configurations, is an LTM-specific configuration of the cell.

16. The method of claim 15, further comprising:

activating one or more of the first measurement or reporting configuration or the second measurement or reporting configuration.

17. The method of claim 15, further comprising:

transmitting, to the network node, an indication that one or more of the first measurement or reporting configuration or the second measurement or reporting configuration is activated.

18. The method of claim 15, further comprising:

receiving, from the network node, an indication to activate one or more of the first measurement or reporting configuration or the second measurement or reporting configuration.

19. The method of claim 14, wherein the cell is a serving SCell and the candidate LTM cell is a candidate LTM PCell, and wherein the serving SCell is a deactivated serving SCell.

20. The method of claim 19, further comprising:

determining to not perform measurements or reporting for the serving SCell based at least in part on the serving SCell being the deactivated serving SCell and the candidate LTM cell.

* * * * *